(12) United States Patent
Ben-Lavi et al.

(10) Patent No.: US 11,587,238 B2
(45) Date of Patent: Feb. 21, 2023

(54) BARRIER DETECTION FOR SUPPORT STRUCTURES

(71) Applicant: ZEBRA TECHNOLOGIES CORPORATION, Lincolnshire, IL (US)

(72) Inventors: Eliezer Azi Ben-Lavi, Waterloo (CA); Qifeng Gan, Oakville (CA); Vlad Gorodetsky, North York (CA)

(73) Assignee: Zebra Technologies Corporation, Lincolnshire, IL (US)

( * ) Notice: Subject to any disclaimer, the term of this patent is extended or adjusted under 35 U.S.C. 154(b) by 218 days.

(21) Appl. No.: 17/081,412

(22) Filed: Oct. 27, 2020

(65) Prior Publication Data
US 2022/0130050 A1    Apr. 28, 2022

(51) Int. Cl.
| | |
|---|---|
| *G06T 7/168* | (2017.01) |
| *G06T 7/13* | (2017.01) |
| *G06T 7/00* | (2017.01) |
| *G06T 7/174* | (2017.01) |
| *G06V 10/22* | (2022.01) |
| *G06V 10/26* | (2022.01) |
| *G06T 7/11* | (2017.01) |
| *G06V 10/42* | (2022.01) |
| *G06T 7/143* | (2017.01) |

(52) U.S. Cl.
CPC ............ *G06T 7/168* (2017.01); *G06T 7/0004* (2013.01); *G06T 7/11* (2017.01); *G06T 7/13* (2017.01); *G06T 7/143* (2017.01); *G06T 7/174* (2017.01); *G06V 10/22* (2022.01); *G06V 10/273* (2022.01); *G06V 10/431* (2022.01); G06T 2207/20224 (2013.01)

(58) Field of Classification Search
CPC ... G06T 7/168; G06T 7/11; G06T 7/13; G06T 7/143; G06T 7/174; G06T 7/10; G06T 7/12; G06T 7/194; G06T 7/0004; G06T 2207/20224; G06T 7/0008; G06V 10/20; G06V 10/00; G06V 10/70–87; G06V 10/88–92; G06V 30/16–168; G06V 30/199; G06V 30/20; G06V 10/22; G06V 30/1444; G06V 10/273; G06V 30/155; G06V 10/431; G06V 30/187; G06K 9/00; G06Q 50/28; G06Q 10/087
See application file for complete search history.

(56) References Cited

U.S. PATENT DOCUMENTS

| | | | |
|---|---|---|---|
| 2019/0236531 A1* | 8/2019 | Adato | ............... G06Q 10/0633 |
| 2022/0108264 A1* | 4/2022 | Skaff | .................... B65G 1/137 |

FOREIGN PATENT DOCUMENTS

WO    WO-2021071123 A2 *    4/2021    ........... G06Q 10/087

* cited by examiner

*Primary Examiner* — Geoffrey E Summers

(57) ABSTRACT

A method of barrier detection in an imaging controller includes: obtaining an image of a support structure configured to support a plurality of items on a support surface extending between a shelf edge and a shelf back; extracting frequency components representing pixels of the image; based on the extracted frequency components, identifying a barrier region of the image, the barrier region containing a barrier adjacent to the shelf edge; and detecting at least one empty sub-region within the barrier region, wherein the empty sub-region is free of items between the barrier and the shelf back.

20 Claims, 12 Drawing Sheets

BARRIER DETECTION FOR SUPPORT STRUCTURES

BACKGROUND

Environments in which objects are managed, such as retail facilities, warehousing and distribution facilities, and the like, may store such objects in regions such as aisles of shelf modules or the like. For example, a retail facility may include objects such as products for purchase. A mobile automation apparatus may be deployed within such facilities to capture images and/or point clouds representing an aisle in a retail facility for use in detecting product status information (e.g. when a product is out of stock). Certain shelves may have structural features that lead to artifacts in the captured data, however, which may result in inaccurate product detections and/or product status information.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
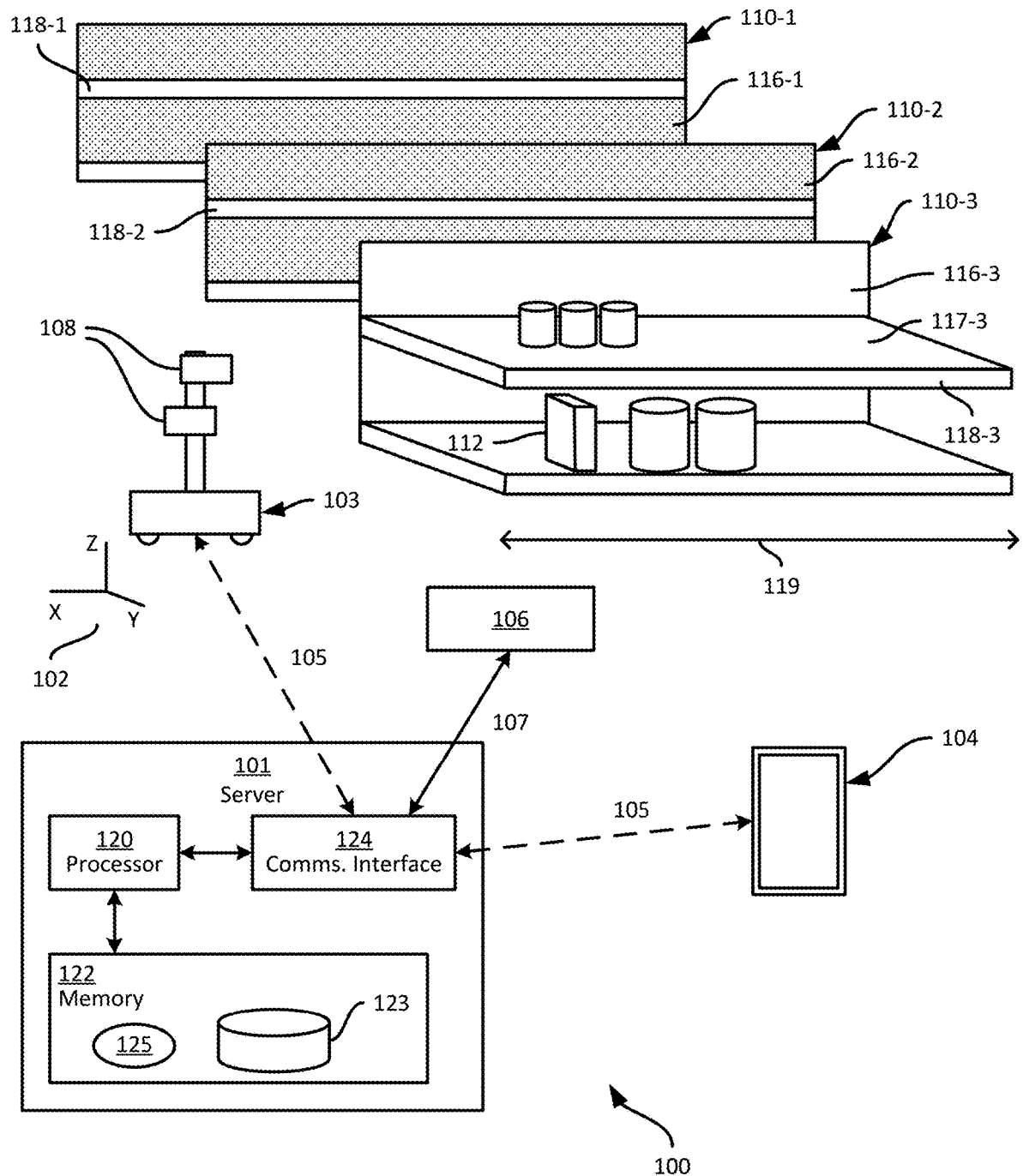
FIG. 1 is a schematic of a mobile automation system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method of barrier detection in an imaging controller, the method comprising: obtaining, by the imaging controller from an image sensor, an image of a support structure configured to support a plurality of items on a support surface extending between a shelf edge and a shelf back; extracting, by the imaging controller, frequency components representing pixels of the image; based on the extracted frequency components, identifying, by the imaging controller, a barrier region of the image, the barrier region containing a barrier adjacent to the shelf edge; and detecting, by the imaging controller, at least one empty sub-region within the barrier region, wherein the empty sub-region is free of items between the barrier and the shelf back.

Additional examples disclosed herein are directed to a computing device, comprising: a memory; an image sensor; and an imaging controller configured to: obtain, from the image sensor, an image of a support structure configured to support a plurality of items on a support surface extending between a shelf edge and a shelf back; extract frequency components representing pixels of the image; based on the extracted frequency components, identify a barrier region of the image, the barrier region containing a barrier adjacent to the shelf edge; and detect at least one empty sub-region within the barrier region, wherein the empty sub-region is free of items between the barrier and the shelf back.

In various embodiments, the subject matter of the present disclosure provides a technical improvement including the reduction of artifacts in object detections from image data, by performing frequency-based processing of the image data to detect and correct for physical barriers that may cause such artifacts.

FIG. 1 depicts a mobile automation system 100 in accordance with the teachings of this disclosure. The system 100 includes a server 101 in communication with at least one mobile automation apparatus 103 (also referred to herein simply as the apparatus 103) and at least one client computing device 104 via communication links 105, illustrated in the present example as including wireless links. In the present example, the links 105 are provided by a wireless local area network (WLAN) deployed via one or more access points (not shown). In other examples, the server 101, the client device 104, or both, are located remotely (i.e. outside the environment in which the apparatus 103 is deployed), and the links 105 therefore include wide-area networks such as the Internet, mobile networks, and the like. The system 100 also includes a dock 106 for the apparatus 103 in the present example. The dock 106 is in communication with the server 101 via a link 107 that in the present example is a wired link. In other examples, however, the link 107 is a wireless link.

The client computing device 104 is illustrated in FIG. 1 as a mobile computing device, such as a tablet, smart phone or the like. In other examples, the client device 104 is implemented as another type of computing device, such as a desktop computer, a laptop computer, another server, a kiosk, a monitor, and the like. The system 100 can include a plurality of client devices 104 in communication with the server 101 via respective links 105.

The system 100 is deployed, in the illustrated example, in a retail facility including a plurality of support structures such as shelf modules 110-1, 110-2, 110-3 and so on (collectively referred to as shelf modules 110 or shelves 110, and generically referred to as a shelf module 110 or shelf 110—this nomenclature is also employed for other elements discussed herein). Each shelf module 110 supports a plurality of products 112 (also referred to as items), which may also be referred to as items. Each shelf module 110 includes a shelf back 116-1, 116-2, 116-3 and a support surface (e.g.

support surface 117-3 as illustrated in FIG. 1) extending from the shelf back 116 to a shelf edge 118-1, 118-2, 118-3. A variety of other support structures may also be present in the facility, such as pegboards, tables, and the like.

The shelf modules 110 (also referred to as sub-regions of the facility) are typically arranged in a plurality of aisles (also referred to as regions of the facility), each of which includes a plurality of modules 110 aligned end-to-end. In such arrangements, the shelf edges 118 face into the aisles, through which customers in the retail facility, as well as the apparatus 103, may travel. As will be apparent from FIG. 1, the term "shelf edge" 118 as employed herein, which may also be referred to as the edge of a support surface (e.g., the support surfaces 117) refers to a surface bounded by adjacent surfaces having different angles of inclination. In the example illustrated in FIG. 1, the shelf edge 118-3 is at an angle of about ninety degrees relative to the support surface 117-3 and to the underside (not shown) of the support surface 117-3. In other examples, the angles between the shelf edge 118-3 and the adjacent surfaces, such as the support surface 117-3, is more or less than ninety degrees.

The apparatus 103 is equipped with a plurality of navigation and data capture sensors 108, such as image sensors (e.g. one or more digital cameras) and depth sensors (e.g. one or more Light Detection and Ranging (LIDAR) sensors, one or more depth cameras employing structured light patterns, such as infrared light, or the like). The apparatus 103 is deployed within the retail facility and, via communication with the server 101 and use of the sensors 108, navigates autonomously or partially autonomously along a length 119 of at least a portion of the shelves 110.

While navigating among the shelves 110, the apparatus 103 can capture images, depth measurements and the like, representing the shelves 110 and the items 112 supported by the shelves 110 (generally referred to as shelf data or captured data). Navigation may be performed according to a frame of reference 102 established within the retail facility. The apparatus 103 therefore tracks its pose (i.e. location and orientation) in the frame of reference 102.

The server 101 includes a special purpose controller, such as a processor 120, specifically designed to control and/or assist the mobile automation apparatus 103 to navigate the environment and to capture data. The processor 120 is interconnected with a non-transitory computer readable storage medium, such as a memory 122, having stored thereon computer readable instructions for performing various functionality, including control of the apparatus 103 to navigate the modules 110 and capture shelf data, as well as post-processing of the shelf data. The memory 122 can also store data for use in the above-mentioned control of the apparatus 103 and post-processing of captured data, such as a repository 123. The repository 123 can contain, for example, a map of the facility, operational constraints for use in controlling the apparatus 103, the image and/or depth data captured by the apparatus 103, and the like.

The memory 122 includes a combination of volatile memory (e.g. Random Access Memory or RAM) and non-volatile memory (e.g. read only memory or ROM, Electrically Erasable Programmable Read Only Memory or EEPROM, flash memory). The processor 120 and the memory 122 each comprise one or more integrated circuits. In some embodiments, the processor 120 is implemented as one or more central processing units (CPUs) and/or graphics processing units (GPUs).

The server 101 also includes a communications interface 124 interconnected with the processor 120. The communications interface 124 includes suitable hardware (e.g. transmitters, receivers, network interface controllers and the like) allowing the server 101 to communicate with other computing devices—particularly the apparatus 103, the client device 104 and the dock 106—via the links 105 and 107. The links 105 and 107 may be direct links, or links that traverse one or more networks, including both local and wide-area networks. The specific components of the communications interface 124 are selected based on the type of network or other links that the server 101 is required to communicate over. In the present example, as noted earlier, a wireless local-area network is implemented within the retail facility via the deployment of one or more wireless access points. The links 105 therefore include either or both wireless links between the apparatus 103 and the mobile device 104 and the above-mentioned access points, and a wired link (e.g. an Ethernet-based link) between the server 101 and the access point.

The processor 120 can therefore obtain data captured by the apparatus 103 via the communications interface 124 for storage (e.g. in the repository 123) and subsequent processing (e.g. to detect objects such as shelved products 112 in the captured data, and detect status information corresponding to the objects). The server 101 maintains, in the memory 122, an application 125 executable by the processor 120 to perform such subsequent processing. In particular, as discussed in greater detail below, the server 101 is configured, via execution of the instructions of the application 125 by the processor 120, to detect barrier structures on the shelves 110 and to use such barrier detections to correct false positive product detections which may otherwise arise from the presence of the barrier structures. The above functions implemented by the server 101 may therefore enable the server 101 or other computing devices operating on the data captured by the apparatus 103 to generate more accurate product status information in the presence of certain types of shelves 110.

The server 101 may also transmit status notifications (e.g. notifications indicating that products are out-of-stock, in low stock or misplaced) to the client device 104 responsive to the determination of product status data. The client device 104 includes one or more controllers (e.g. central processing units (CPUs) and/or field-programmable gate arrays (FPGAs) and the like) configured to process notifications and other information received from the server 101. For example, the client device 104 includes a display 132 controllable to present information received from the server 101.

Figure 2:
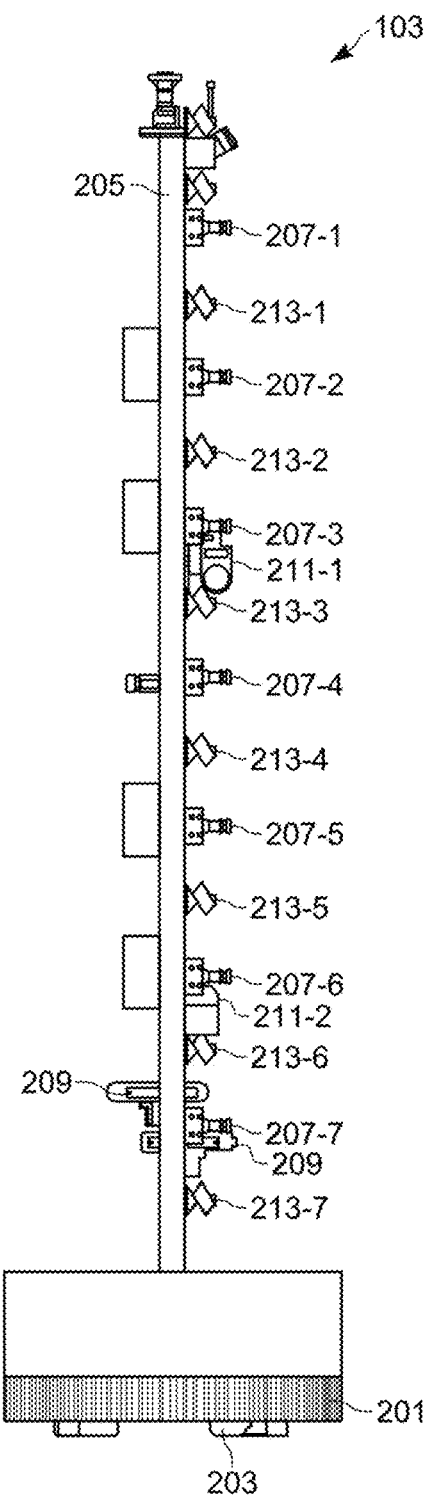
FIG. 2 is a side view of a mobile automation apparatus in the system of FIG. 1.

Turning now to FIG. 2, the mobile automation apparatus 103 is shown in greater detail. The apparatus 103 includes a chassis 201 containing a locomotive assembly 203 (e.g. one or more electrical motors driving wheels, tracks or the like). The apparatus 103 further includes a sensor mast 205 supported on the chassis 201 and, in the present example, extending upwards (e.g., substantially vertically) from the chassis 201. The mast 205 supports the sensors 108 mentioned earlier. In particular, the sensors 108 include at least one imaging sensor 207, such as a digital camera. In the present example, the mast 205 supports seven digital cameras 207-1 through 207-7 oriented to face the shelves 110.

The mast 205 also supports at least one depth sensor 209, such as a 3D digital camera capable of capturing both depth data and image data. The apparatus 103 also includes additional depth sensors, such as LIDAR sensors 211. In the present example, the mast 205 supports two LIDAR sensors 211-1 and 211-2. As shown in FIG. 2, the cameras 207 and the LIDAR sensors 211 are arranged on one side of the mast 205, while the depth sensor 209 is arranged on a front of the mast 205. That is, the depth sensor 209 is forward-facing (i.e. captures data in the direction of travel of the apparatus 103), while the cameras 207 and LIDAR sensors 211 are side-facing (i.e. capture data alongside the apparatus 103, in a direction perpendicular to the direction of travel). In other examples, the apparatus 103 includes additional sensors, such as one or more RFID readers, temperature sensors, and the like.

The mast 205 also supports a plurality of illumination assemblies 213, configured to illuminate the fields of view of the respective cameras 207. The illumination assemblies 213 may be referred to collectively as an illumination subsystem. That is, the illumination assembly 213-1 illuminates the field of view of the camera 207-1, and so on. The cameras 207 and lidars 211 are oriented on the mast 205 such that the fields of view of the sensors each face a shelf 110 along the length 119 of which the apparatus 103 is traveling. The apparatus 103 is configured to track a pose of the apparatus 103 (e.g. a location and orientation of the center of the chassis 201) in the frame of reference 102, permitting data captured by the apparatus 103 to be registered to the frame of reference 102 for subsequent processing.

Figure 3:
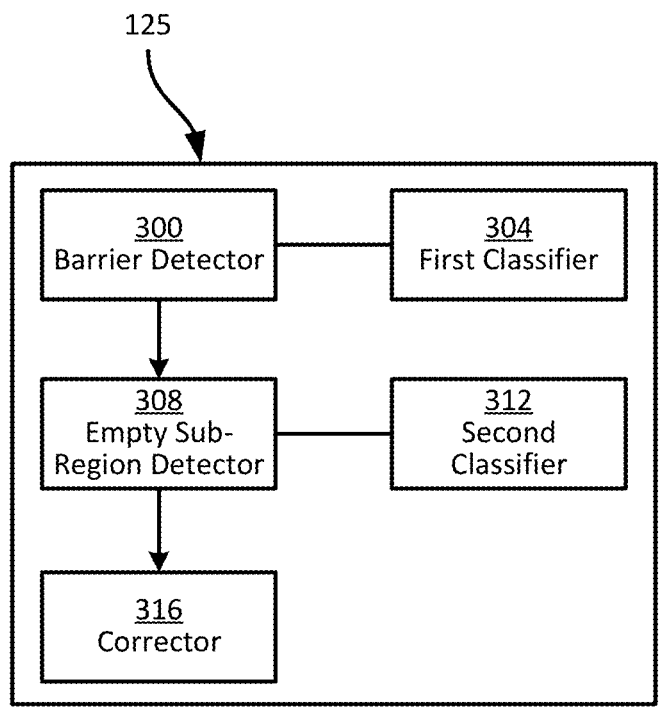
FIG. 3 is a diagram illustrating certain internal components of the server of FIG. 1.

Turning to FIG. 3, certain components of the application 125 are illustrated. As will be apparent to those skilled in the art, the application 125 can also be implemented as a suite of distinct applications in other examples. Further, some or all of the modules described below can be implemented via distinct control hardware such as one or more ASICs and/or FPGAs.

As will be discussed in further detail below, certain shelves 110 include barriers such as fences adjacent to a shelf edge 118, e.g. to prevent items 112 from sliding off the front of the support surface 117. The fences generally have gaps therethrough, being formed from wire grids or the like. However, the fences may nevertheless cause artifacts in depth data captured by the apparatus 103 that are sufficient to result in false-positive item detections based on captured data. The application 125, in general, includes components configured to detect such barriers and determine whether the space on support surfaces 117 behind such barriers are empty.

In particular, the application 125 includes a barrier detector 300 configured to extract frequency data from images captured by the apparatus 103 and employ the frequency data to detect regions of the images that contain barriers. The detector 300 cooperates with a first classifier 304 to perform such detections.

The application 125 also includes an empty sub-region detector 308 configured to receive the barrier region detections from the detector 300. The detector 308 detects, within such regions, sub-regions that are empty behind the barrier (i.e. where no items 112 are present on the support surface 117 behind the barrier). The detector 308 cooperates with a second classifier 312 to perform such detections.

The application 125 can also include a corrector 316 that is configured to receive the empty sub-region detections from the detector 308 and to generate corrected item detections using the empty sub-regions and candidate item detections, e.g. from another detection mechanism (not shown in FIG. 3).

In other examples, the components shown in FIG. 3 can be implemented as distinct applications. In further examples, at least one of the components shown in FIG. 3 can be implemented as a specialized hardware element, such as a field programmable gate array (FPGA), application-specific integrated circuit (ASIC) or the like. The processor, as configured via execution of the application 125, or a suitable combination of the above-mentioned specialized hardware elements, may also be referred to herein as an imaging controller.

Figure 4:
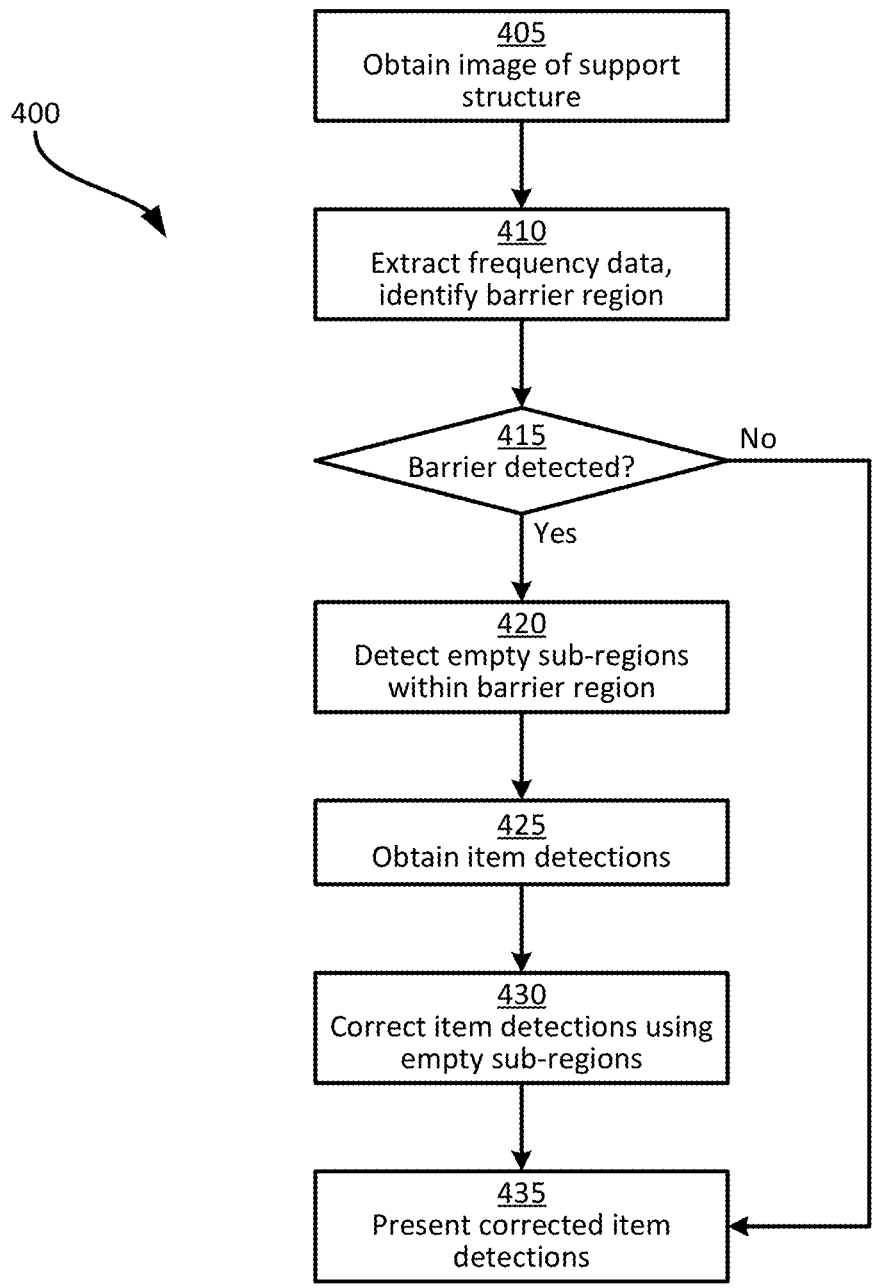
FIG. 4 is a flowchart of a method of barrier detection.

Turning to FIG. 4, a method 400 of detecting barrier structures is illustrated. The method 400 will be described in conjunction with its performance by the server 101, and specifically by the processor 120 via execution of the application 125. In other examples, however, at least some of the functionality implemented via the method 400 can be performed by another computing device, such as the apparatus 103.

At block 405, the server 101, and specifically the barrier detector 300 in this example, obtains an image of a support structure. The image may be retrieved from the repository 123, having previously been captured by the apparatus 103. The apparatus 103 captures a plurality of images as the apparatus 103 travels along a shelf module 110. The images may subsequently be combined, e.g. using the tracked poses of the apparatus 103 as mentioned above, to generate a composite image. In the discussion below, it will be assumed that generation of a composite image has already been completed.

Figure 5:
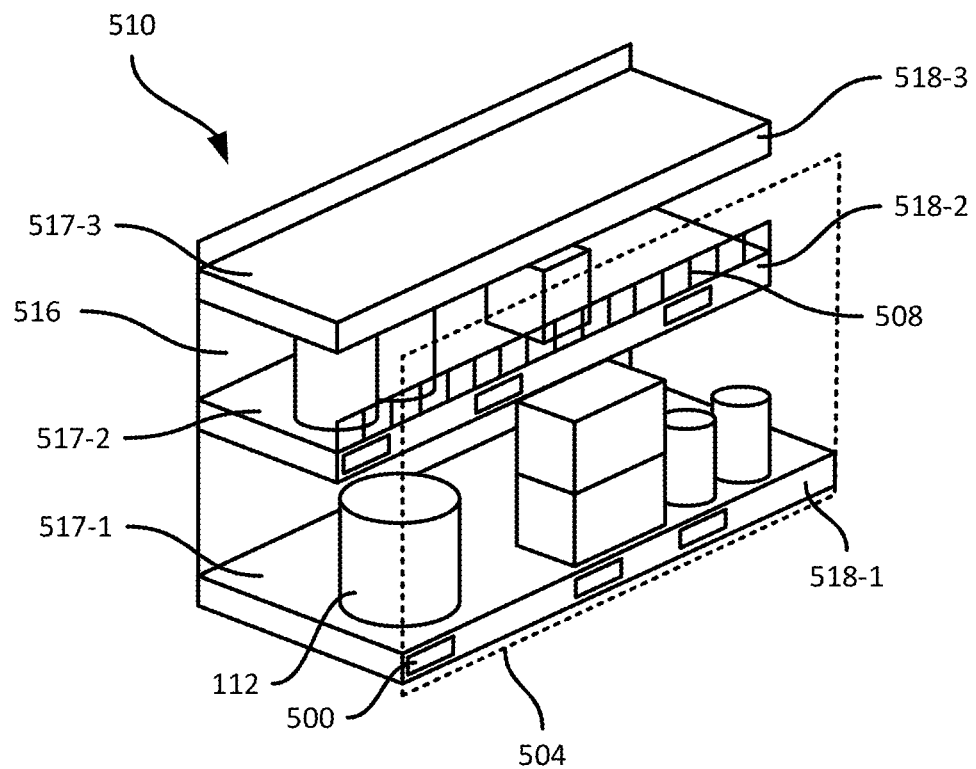
FIG. 5 is a diagram illustrating an example shelf structure including a barrier.

Turning to FIG. 5, an example module 510 is illustrated including three support surfaces 517-1, 517-2, and 517-3, extending from a shelf back 516 to respective shelf edges 518-1, 518-2, and 518-3. The support surfaces 517-1 and 517-2 are shown supporting various items 112 identified by labels 500 supported on the shelf edges 518, while the support surface 517-3 is illustrated as empty. A field of view 504 is shown, illustrating that the full extent of the module 510 is captured, e.g. in a series of images collected by the apparatus 103 as the apparatus 103 traverses the module 510.

FIG. 5 also illustrates a barrier 508 such as a fence, extending upwards from the support surface 517-2 adjacent to the shelf edge 518-2. The barrier 508 may be installed to prevent items 112 from sliding or otherwise falling from the support surface 517-2. As will be apparent, however, item detection mechanisms that rely on depth data captured by the LIDAR sensors 211 of the apparatus 103 may incorrectly conclude that an item 112 is present where there in fact is no item 112, because of LIDAR artifacts caused by the barrier 508.

Figure 6:
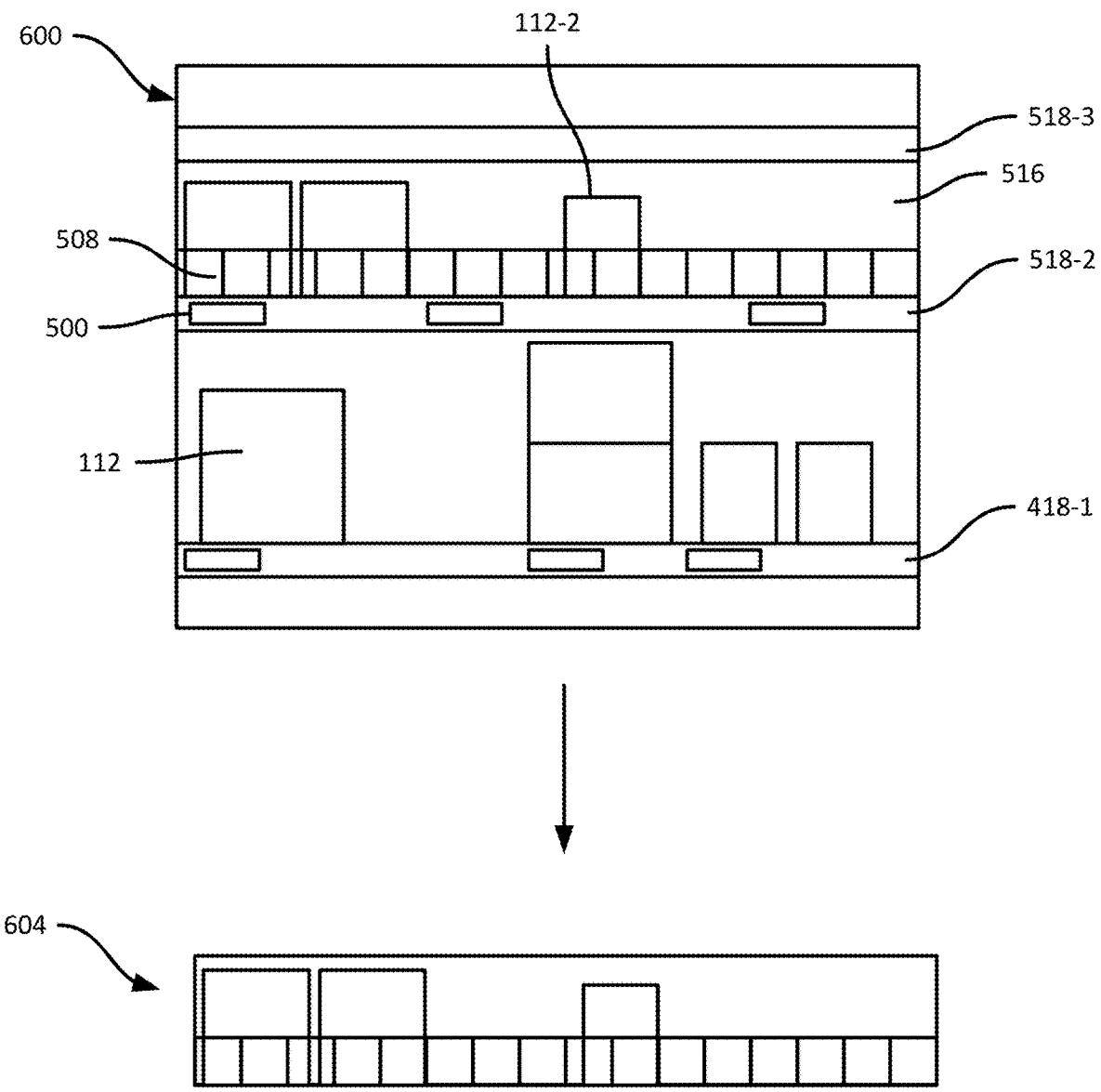
FIG. 6 is a diagram illustrating an image of the shelf structure of FIG. 5, and an example performance of block 305 of the method of FIG. 3.

Turning to FIG. 6, an image 600 (e.g. a composite image as mentioned above) encompassing the field of view 504 is shown. To simplify processing of the image via the method 400, the barrier detector 300 can be configured to retrieve a portion of the image 600 for processing in a given performance of the method 400, rather than the entire image. For example, the barrier detector 300 can select a portion of the image 600 bounded at the upper and lower edges by shelf edges 518.

Specifically, at block 405 the barrier detector 300 can also obtain shelf edge regions, e.g. detected by a shelf detection mechanism prior to initiation of the method 400. The shelf edge regions may be bounding boxes defining the positions of the shelf edges 518 in the image 600. Thus, the barrier detector 300 can select adjacent shelf edges 518 based on the shelf edge regions, and retrieve a portion 604 of the image, as also shown in FIG. 6. The portion 604 is the portion of the image 600 between the shelf edges 518-2 and 518-3, and therefore depicts any items 112 and other objects (including, in this case, the barrier 508) that are supported on the support surface 517-2. For simplicity, the portion 604 will be referred to below simply as "the image 604". It will be understood that in other examples, the image 600 may be subdivided for processing via the method 400 in other manners.

At block 410, the barrier detector 300 is configured to extract frequency data from the image 604, and identify a barrier region within the image 604. The barrier region is, in the present example, a rectangular region of the image 604 that encompasses the barrier 508 and substantially excludes portions of the image 604 that do not contain any part of the barrier 508.

The extraction of frequency data for use in identifying the barrier region arises from a recognition that the barrier 508, and many other barriers deployed on support structures in retail facilities, includes recurring structural features in the form of gaps between posts forming the barrier 508. Pixels depicting the barrier 508, when represented in the frequency domain, therefore exhibit harmonic peaks distinct from peaks exhibited by frequency-domain representations of pixels that do not represent the barrier 508.

Figure 7:
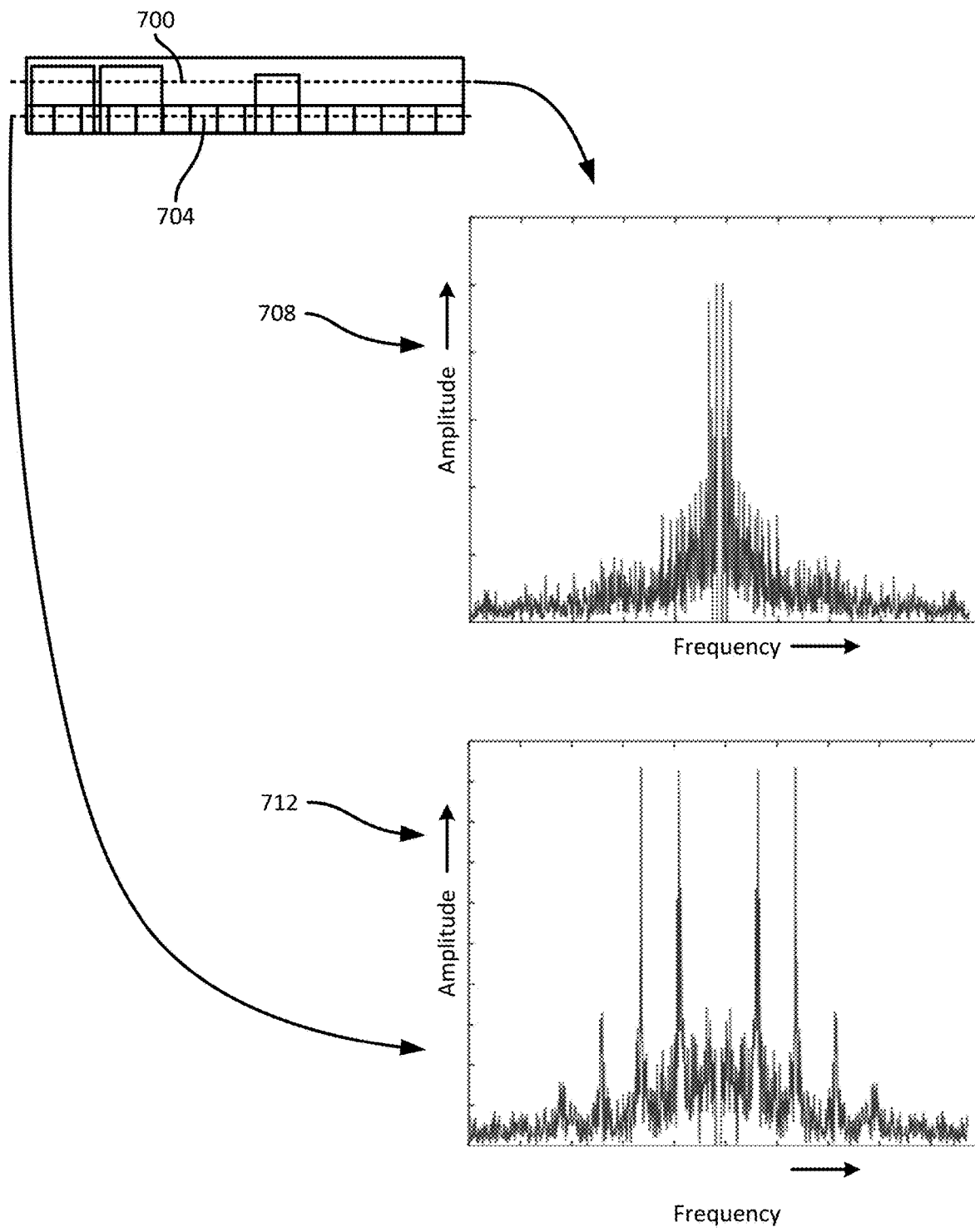
FIG. 7 is a diagram illustrating extraction of frequency components from portions of the image of FIG. 6.

In particular, two rows 700 and 704 of pixels are shown as being transformed into the frequency domain (e.g. via fast Fourier transform (FFT) in FIG. 7. The row 700, which does not contain any portion of the barrier 508, produces a set of frequency components 708 including a narrow cluster of central peaks. The row 704, on the other hand, which traverses the barrier 508, produces a set of frequency components 712 that includes a number of harmonic peaks at divergent frequencies. The barrier detector 300 is therefore configured to base the identification of the barrier region on frequency components extracted from the image 604.

Figure 8:
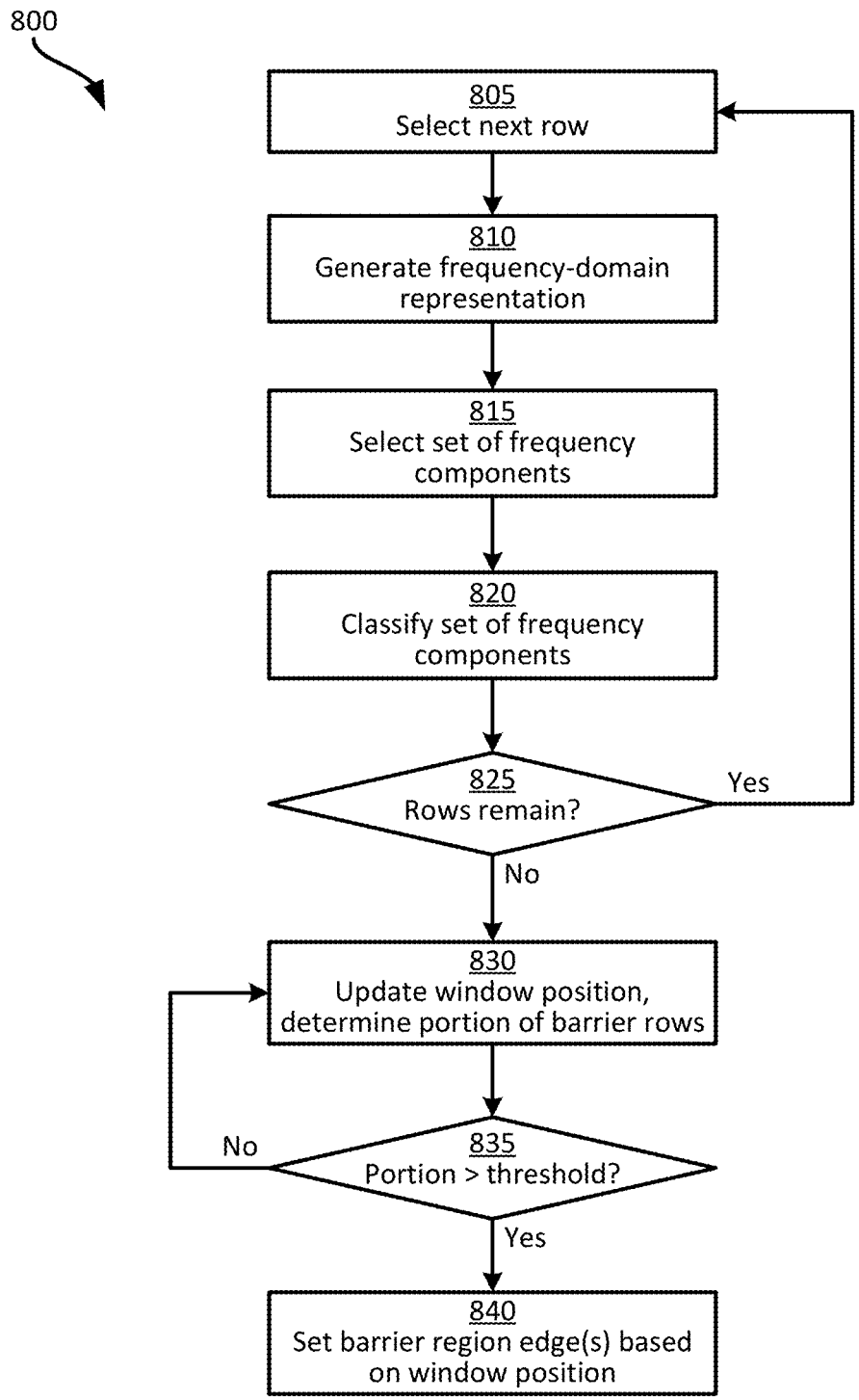
FIG. 8 is a flowchart of a method of performing block 410 of the method of FIG. 4.

In particular, turning to FIG. 8, a method 800 of extracting frequency data and identifying the barrier region is shown. That is, the method 800 is a method of performing block 410 of the method 400. In general, the barrier detector 300 selects successive sets of frequency components representing rows of pixels in the image 604, and classifies each row as depicting a barrier, or not.

At block 805, the barrier detector 300 is configured to select a row of the image 604. For example, the barrier detector 300 may begin at the upper row of the image 604. At block 810, the barrier detector 300 generates a frequency-domain representation of the selected row, e.g. by computing the FFT for the row. As will be apparent to those skilled in the art, each pixel of the image 604 may include multiple channels of data (e.g. red, green, and blue values for the RGB color space, or lightness, green/red, and blue/yellow values for the Lab color space). The FFT may be computed for multiple channels, or for only one channel (e.g. the L, or lightness, channel).

At block 815, the barrier detector 300 selects a set of frequency components, e.g. by sampling the FFT at a predefined interval, or to select a predetermined number of samples. For example, returning to FIG. 7, the FFT 712 of the row 704 may be sampled at one hundred equally-spaced frequencies (i.e. positions along the Frequency axis). A wide variety of other sampling arrangements may also be employed. The sampled frequency components defining the selected row may be concatenated into an input vector for classification. When multiple channels are employed at block 815, a set of frequency components may be selected for each channel, and all the selected frequency components may be concatenated into a single input vector.

At block 820, the barrier detector 300 is configured to provide the input vector mentioned above to the classifier 304. The classifier is a supervised machine learning mechanism, such as a support vector machine (SVM) classifier, previously trained to distinguish between sets of frequency components representing rows of pixels that depict a barrier, and sets of frequency components representing rows of pixels that do not depict a barrier. The classifier 304, in other words, accepts the input vector generated by the barrier detector 300, and assigns to the corresponding row of pixels one of a barrier class, and a non-barrier class. The assigned class is returned to the barrier detector 300, which stores the assigned class in conjunction with the corresponding row of pixels. For example, the barrier detector 300 can maintain a registry of rows from the image 604, along with class indicators for each row.

At block 825, the barrier detector 300 determines whether rows remain to be processed, and if so, returns to block 805. Thus, blocks 805-820 are repeated until every row of the image 604 has been assigned one of the two classes noted above.

In response to a negative determination at block 825, every row of the image 604 has been classified as depicting the barrier 508 or not. However, the classifier 304 may generate false positives (i.e. assign the barrier class to a row that does not in fact depict the barrier 508), or false negatives (i.e. assign the non-barrier class to a row that does in fact depict the barrier 508). To identify the barrier region from the row classifications obtained via block 820, the barrier detector 300 is configured to evaluate successive groups of rows to determine the likely position of an upper edge of the barrier.

In particular, at block 830, the barrier detector 300 is configured to set a position of a selection window over the image 604. The selection window encompasses a group of rows, according to the predefined height of the window. For example, the window may have a height of twenty rows, and therefore encompass a total of twenty rows of the image 604. Which rows are within the window depends on the position of the window. As will be seen below, the window's position is updated through successive performances of block 830, so as to traverse the image 604 vertically.

Figure 9:
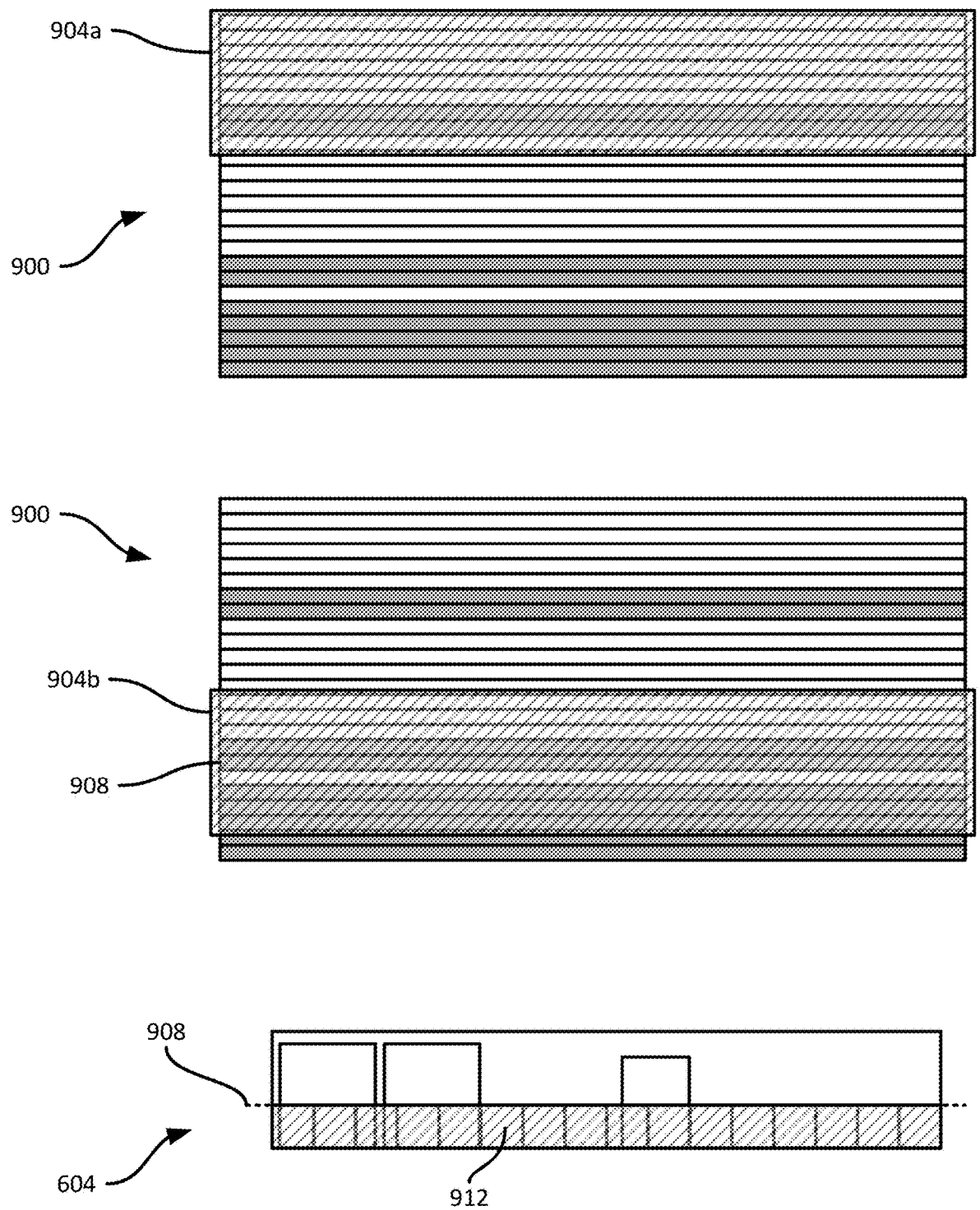
FIG. 9 is a diagram illustrating a performance of the method of FIG. 8.

The initial position of the window is at the upper edge of the image 604. Turning to FIG. 9, a simplified illustration of the image 604 is shown in the form of a set 900 of rows making up the image 604, with each row colored white if assigned the non-barrier class, and dark if assigned the barrier class. A selection window 904a is also illustrated in an initial position at the upper edge of the set 900. The window 904a therefore encompasses a group of nine rows.

Returning to FIG. 8, at block 830 the barrier detector 300 also determines a portion of the rows within the window 904a that are assigned the barrier class. In the present example, the window 904a contains two barrier-classified rows, and the portion is therefore two of nine, or about 22%.

At block 835, the barrier detector 300 determines whether the portion mentioned above exceeds a predetermined threshold. In this example the threshold is 50%, although in other examples a wide variety of other thresholds may be employed. In general, the threshold is selected prior to deploying the barrier detector 300, to enable the detection of a barrier in the presence of false negative classifications, while avoiding incorrect detection of a barrier due to a small number of false positive classifications.

The window 904a as shown in FIG. 9 does not satisfy the threshold mentioned above. The barrier detector 300 therefore returns to block 830 and updates the position of the selection window, e.g. by shifting the window toward the lower edge of the image 604 by a predetermined number of rows (e.g. one row, although larger shifts may also be implemented). Prior to returning to block 830, the barrier detector 300 can determine whether the window has reached the lower edge of the image 604. When the lower edge of the image 604 has been reached without an affirmative determination at block 835, the barrier detector proceeds to block 415 of the method 400, as will be described below.

The above process is repeated until the lower edge of the image 604 is reached, or until a positive determination at block 835. Turning to FIG. 9, another window 904b is shown, following a plurality of performances of block 830 and 835. As seen in FIG. 9, the window 904b contains five barrier-classified rows out of a total of nine rows. The determination at block 835 is therefore affirmative, and the barrier detector 300 proceeds to block 840. At block 840, the barrier detector 300 sets barrier region edges. In particular, an upper edge of the barrier region is set at the middle of the window 904b. Thus, the row 908 is selected as the upper edge of the barrier region. In other examples, the upper edge of the barrier region may be set as a different row within the window 904b (e.g. depending on the threshold applied at block 835).

The lower and side edges of the barrier region, in this example, are simply the lower and side edges of the image 604 itself. In other examples, in which a larger portion of the original image 600 is processed, the lower edge may be the detected upper edge of the shelf edge 518-2, and the side edges may be defined by the detected positions of the side edges of the shelf edge 518-2. FIG. 9 illustrates a barrier region 912 resulting from the performance of the method 800. As seen in FIG. 9, the barrier region encompasses substantially all of the barrier 508, and excludes substantially all portions of the image 604 that do not contain the barrier 508.

Following identification of the barrier region 912, the server 101 proceeds to block 415 of the method 400. At block 415, the server 101 (e.g. the barrier detector 300) determines whether a barrier was detected at block 410. When the determination is negative, as for instance when the method 800 ends without an affirmative determination at block 835, the determination at block 415 is negative, and the server 101 proceeds to block 435, bypassing the remaining barrier-handling functionality.

When the determination at block 415 is affirmative, as in the example shown in FIG. 9, the server 101 proceeds to block 420. At block 420, the empty sub-region detector 308 is configured to detect empty sub-regions within the barrier region 912. Empty sub-regions are regions in which there are no items behind the barrier 508, i.e. between the barrier 508 and the shelf back 516.

Figure 10:
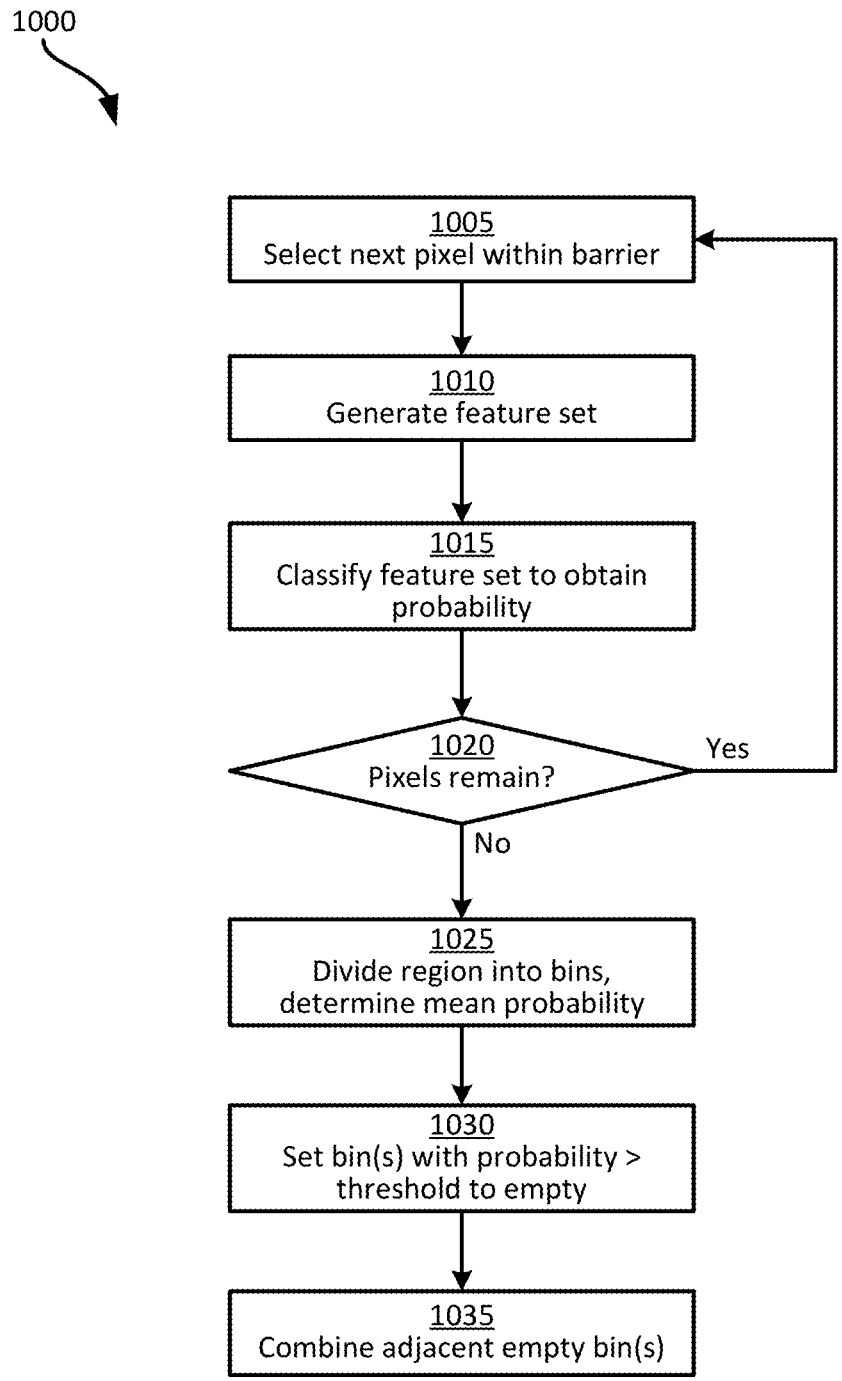
FIG. 10 is a flowchart of a method of performing block 420 of the method of FIG. 4.

Detecting the empty sub-regions, in this example, is performed by classifying each pixel within the barrier region 912, using the classifier 312 shown in FIG. 3. In particular, referring to FIG. 10, a method 1000 of performing block 420 is illustrated. Via performance of the method 1000, the detector 308 is configured to identify portions of the barrier region 912 that depict only the barrier 508 and the shelf back 516, but are empty of items 112.

At block 1005, the detector 308 is configured to select a pixel within the barrier region 912. Every pixel in the barrier region 912 is processed via the method 1000, and the pixels may be processed in any order. For example, in an initial performance of block 1005 the detector 308 may select the top-left pixel of the barrier region 912. At block 1010, the detector 308 is configured to generate a feature set for the selected pixel. The feature set can include any of a wide variety of attributes corresponding to the selected pixel. For example, the feature set can include the mean intensity (e.g. L value) and the standard deviation of the intensity values for a window surrounding the selected pixel (e.g. a 5×5 window, although other window sizes may be employed; features for multiple window sizes may also be generated). The features can include the above mean and standard deviations for the other channels (e.g. a* and b*) as well.

The features generated at block 1015 are concatenated into an input vector for the classifier 312, and at block 1015 the classifier 312 generates a probability that the selected pixel is within an empty sub-region. The classifier 312, e.g. a random forest classifier, is a supervised machine learning mechanism previously trained to assess the likelihood that a given pixel represents part of an empty sub-region, based on the feature set from block 1010.

At block 1020, the detector 308 returns to block 1005 and repeats the above steps until all pixels in the barrier region 912 have been processed. Following an affirmative determination at block 1020, therefore, the detector 308 and classifier 312 have generated a probability map overlaid with the barrier region 912, showing the probability that each part of the barrier map 912 is empty.

Figure 11:
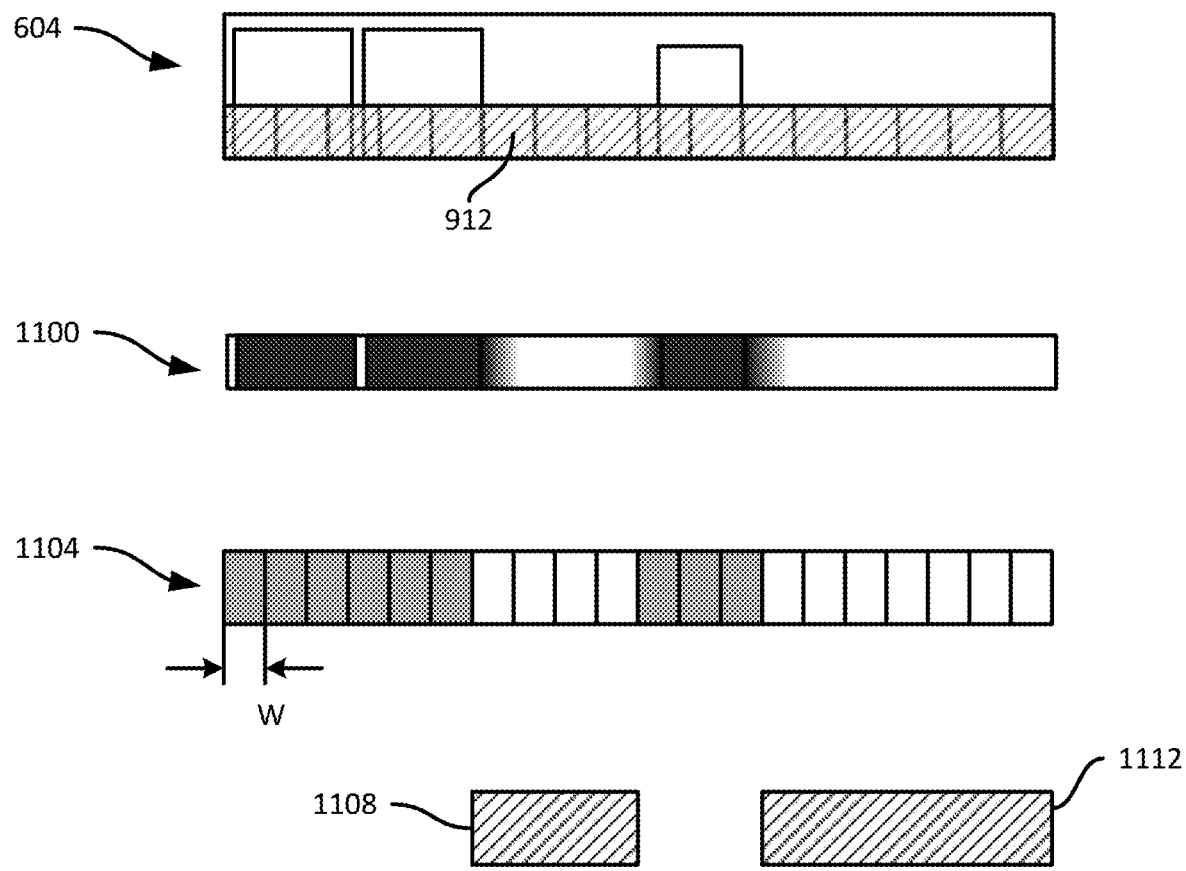
FIG. 11 is a diagram illustrating a performance of the method of FIG. 10.

Turning to FIG. 11, the image 604 with the barrier region 912 are shown, along with a probability map 1100 generated via successive performances of blocks 1005-1015. The probability map is illustrated with darker shading indicating lower probability that a pixel corresponds to an empty sub-region, and lighter shading indicating a higher probability that a pixel corresponds to an empty sub-region.

To detect empty sub-regions from the probability map 1100, the detector 308 is configured to discretize the map 1100. For example, at block 1025 the detector 308 is configured to divide the barrier region 912 into bins, and to determine the mean probability of the pixels within each bin. FIG. 11 illustrates an example set of bins 1104. The width W of the bins, and therefore the number of bins, may be defined in a variety of manners. For example, a predefined number of bins may be generated, with the width W being determined based on the predefined number and the width of the image 604. In other examples, the width W itself may be predetermined, with the number of bins depending on the width W and the width of the image 604.

At block 1030, each bin is assigned a classification as an empty bin or a non-empty bin based on the mean probability of the pixels within the bin. That is, the mean probability is compared to a threshold (e.g. 50%, although various other thresholds may also be employed); if the mean is above the threshold, the bin labelled as empty, and otherwise the bin is labelled as non-empty. The bins 1104 are shown in FIG. 11 following such labelling, with the darker bins being non-empty, and the white bins being empty.

At block 1035, the detector 308 is configured to combine adjacent bins labelled as empty at block 1030, to generate the empty sub-regions. FIG. 11 illustrates two empty sub-regions 1108 and 1112, generated from the contiguous sets of empty-labelled bins in the set 1104.

Figure 12:
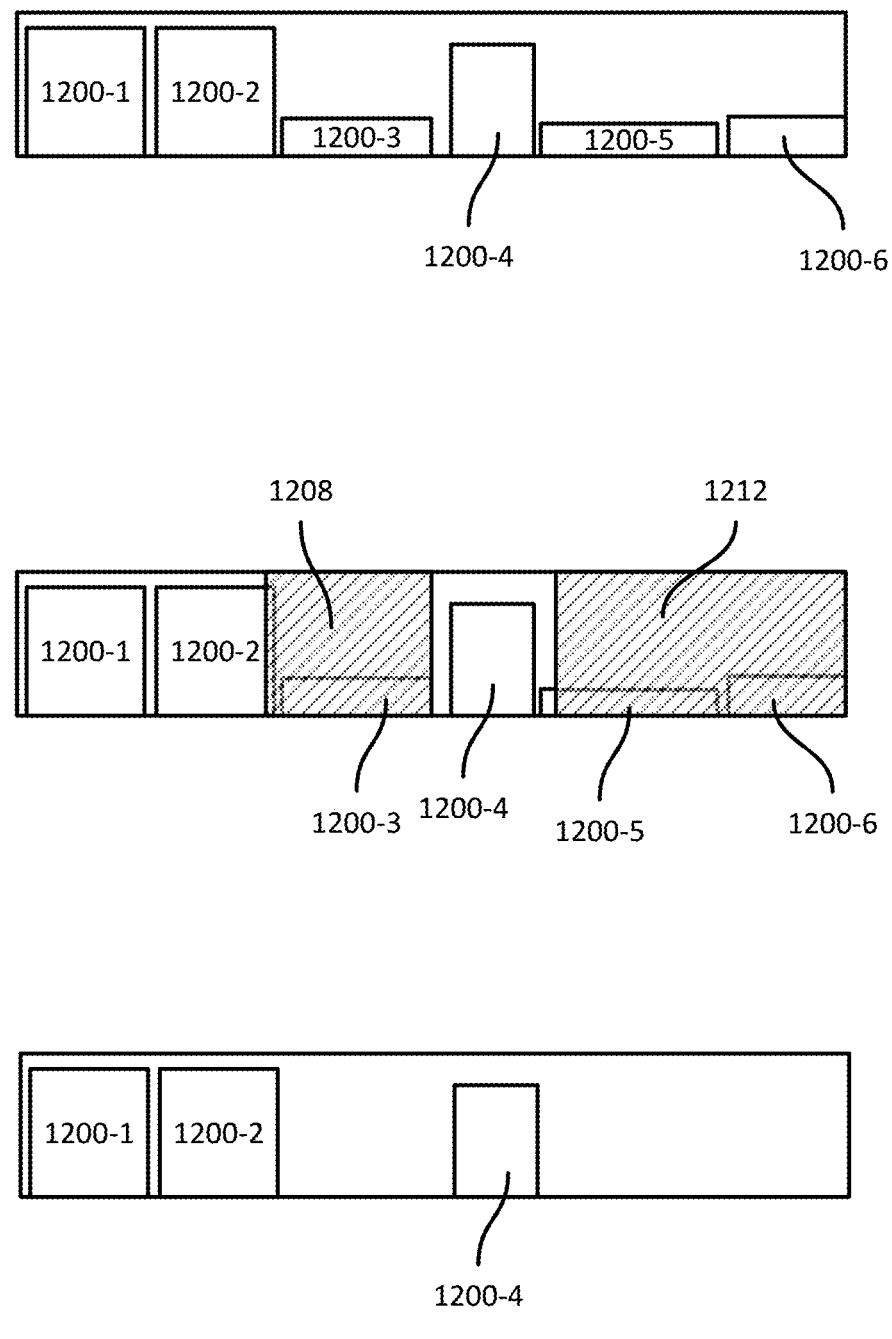
FIG. 12 is a diagram illustrating a performance of blocks 425-435 of FIG. 4.

Returning to FIG. 4, following detection of the empty sub-regions 1108 and 1112, at block 425 the corrector 316 is configured to obtain item detections, e.g. from a detector distinct from the application 125, e.g. another application at the server 101, or a separate computing device. The item detections may be, for example, bounding boxes indicating positions within the image 604 of items 112 detected by the detection mechanism. Turning to FIG. 12, a set of item regions 1200-1, 1200-2, 1200-3, 1200-4, 1200-5, and 1200-6 are illustrated. As will be apparent, the item regions 1200-1, 1200-2, and 1200-4 correspond to actual items 112 in the image 604. The remaining regions 1200, however, are false positive detections, arising from the presence of the barrier 508.

To correct the item detections, the corrector 316 is configured, at block 430, to subtract the empty sub-regions from the item detections. In particular, the empty sub-regions 1108 and 1112 are expanded to the full height of the image 604, and any portion of an item region 1200 overlapping with an empty sub-region is deleted, leaving the remaining (non-overlapping) portion of the item region 1200.

In some examples, prior to such subtraction, the corrector 316 can determine a fraction of overlap between the item sub-regions and a given item region 1200, and compare the fraction to a threshold. When the fraction is below a threshold, such as when the item sub-regions overlap with less than 5% of an item region 1200 (although various other thresholds may also be applied, instead of those mentioned here), the overlap is ignored and no subtraction occurs. When the overlap is greater than 95%, in contrast, the item region 1200 is discarded entirely. Any overlap fractions between the upper and lower thresholds are subtracted.

In FIG. 12, the item regions 1200-1 and 1200-4 have no overlap with any of the expanded empty sub-regions 1208 or 1212 (resulting from expanding the height of the empty sub-regions 1108 and 1112). The item region 1200-2 overlaps with the empty sub-region 1208, but it is assumed that the overlap is below the lower threshold, and is therefore ignored. The item region 1200-5 does not fully overlap with the empty sub-region 1212, but it is assumed that the degree of overlap is above the upper threshold. The item region 1200-5, along with the item regions 1200-3 and 1200-6 (which are fully overlapped) are therefore discarded. FIG. 12 illustrates a corrected set 1204 of item regions produced via block 430.

At block 435, the corrector 316 is configured to present the corrected item detections, e.g. by providing the corrected item region set 1204 to a downstream process configured to determine product status information (e.g. whether an item 112 is out of stock or the like). The corrected item detections may also be transmitted to the client device 104, presented on a display connected to the server 101, or the like.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of barrier detection in an imaging controller, the method comprising:
   obtaining, by the imaging controller from an image sensor, an image of a support structure configured to support a plurality of items on a support surface extending between a shelf edge and a shelf back;
   extracting, by the imaging controller, frequency components representing pixels of the image;
   based on the extracted frequency components, identifying, by the imaging controller, a barrier region of the image, the barrier region containing a barrier adjacent to the shelf edge; and
   detecting, by the imaging controller, at least one empty sub-region within the barrier region, wherein the empty sub-region is free of items between the barrier and the shelf back.

2. The method of claim 1, further comprising:
   obtaining an item region defining a location of an item within the image; and
   generating a corrected item region based on the item region and the empty sub-region.

3. The method of claim 2, wherein generating the corrected item region includes:
   detecting a portion of the empty sub-region that overlaps with the item region; and
   subtracting the overlapping portion from the item region.

4. The method of claim 3, further comprising:
   prior to the subtracting, comparing a first area of the overlapping portion to a second area of the item region;
   when the first area represents a smaller fraction of the second area than a lower threshold, ignoring the overlapping portion; and
   when the first area represents a greater fraction of the second area than an upper threshold, discarding the item region.

5. The method of claim 1, wherein extracting the set of frequency components includes:
   for each row of pixels in the image, generating a frequency-domain representation of the row; and
   selecting a set of frequency components from the frequency-domain representation.

6. The method of claim 5, wherein identifying the barrier region includes:
   assigning each row of pixels in the image one of (i) a barrier class, and (ii) a non-barrier class, based on classification of the corresponding set of frequency components;
   positioning a selection window at an upper edge of the image;
   determining whether a portion of the rows of pixels within the window having the barrier class exceeds a threshold; and
   when the determination is negative, shifting the window towards a lower edge of the image, and repeating the determination.

7. The method of claim 6, wherein the classification of the corresponding set of frequency components includes providing the set of frequency components to a support vector machine (SVM).

8. The method of claim 6, further comprising:
   when the determination is affirmative, setting (i) an upper edge of the barrier region based on the position of the window.

9. The method of claim 1, wherein detecting the empty sub-region includes:
   for each pixel within the barrier region:
     generating a set of features, and
     based on the set of features, generating a probability that the pixel represents an empty region;
   dividing the image into a series of bins; and
   setting each bin as empty when the mean probability of the pixels within the bin exceeds a threshold.

10. The method of claim 9, wherein generating the probability includes providing the set of features to a classifier.

11. A computing device, comprising:
    a memory;
    an image sensor; and
    an imaging controller configured to:
      obtain, from the image sensor, an image of a support structure configured to support a plurality of items on a support surface extending between a shelf edge and a shelf back;
      extract frequency components representing pixels of the image;
      based on the extracted frequency components, identify a barrier region of the image, the barrier region containing a barrier adjacent to the shelf edge; and
      detect at least one empty sub-region within the barrier region, wherein the empty sub-region is free of items between the barrier and the shelf back.

12. The computing device of claim 11, wherein the imaging controller is further configured to:
    obtain an item region defining a location of an item within the image; and
    generate a corrected item region based on the item region and the empty sub-region.

13. The computing device of claim 12, wherein the imaging controller is configured, to generate the corrected item region, to:
    detect a portion of the empty sub-region that overlaps with the item region; and
    subtract the overlapping portion from the item region.

14. The computing device of claim 13, wherein the imaging controller is further configured to:
    prior to the subtraction, compare a first area of the overlapping portion to a second area of the item region;
    when the first area represents a smaller fraction of the second area than a lower threshold, ignore the overlapping portion; and
    when the first area represents a greater fraction of the second area than an upper threshold, discard the item region.

15. The computing device of claim 11, wherein the imaging controller is configured, to extract the set of frequency components, to:
    for each row of pixels in the image, generate a frequency-domain representation of the row; and
    select a set of frequency components from the frequency-domain representation.

16. The computing device of claim 15, wherein the imaging controller is configured, to identify the barrier region, to:
    assign each row of pixels in the image one of (i) a barrier class, and (ii) a non-barrier class, based on classification of the corresponding set of frequency components;
    position a selection window at an upper edge of the image;

determine whether a portion of the rows of pixels within the window having the barrier class exceeds a threshold; and when the determination is negative, shift the window towards a lower edge of the image, and repeat the determination.

17. The computing device of claim 16, wherein the imaging controller is configured, to generate the classification of the corresponding set of frequency components, to provide the set of frequency components to a support vector machine (SVM).

18. The computing device of claim 16, wherein the imaging controller is further configured to:

when the determination is affirmative, set (i) an upper edge of the barrier region based on the position of the window.

19. The computing device of claim 11, wherein the imaging controller is configured, to detect the empty sub-region, to:

for each pixel within the barrier region:
generate a set of features, and
based on the set of features, generate a probability that the pixel represents an empty region;
divide the image into a series of bins; and
set each bin as empty when the mean probability of the pixels within the bin exceeds a threshold.

20. The computing device of claim 19, wherein the imaging controller is configured, to generate the probability, to provide the set of features to a random forest classifier.

* * * * *